No. 712,346. Patented Oct. 28, 1902.
E. T. TURNEY.
PHOTOMETER.
(Application filed June 23, 1902.)
(No Model.)
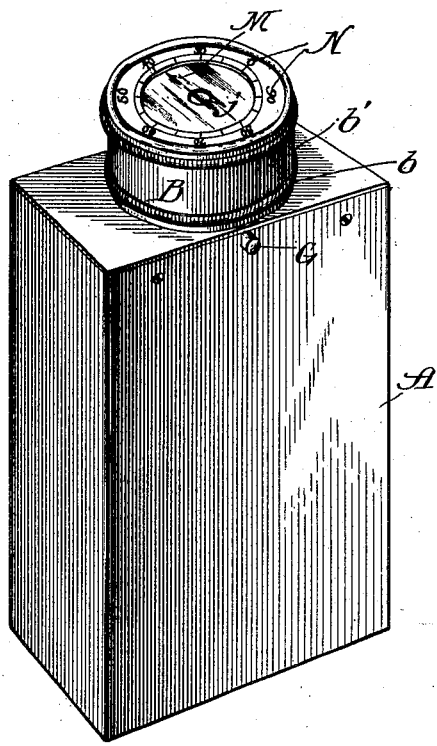
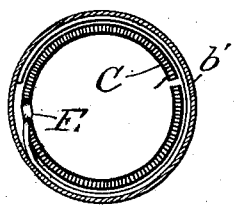
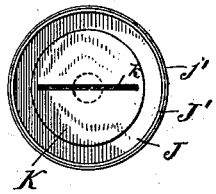
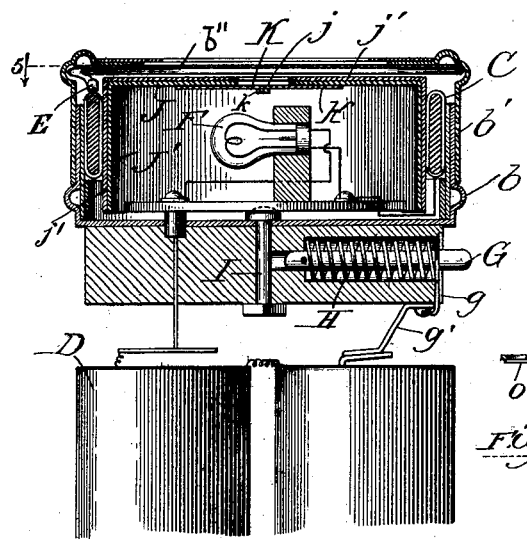
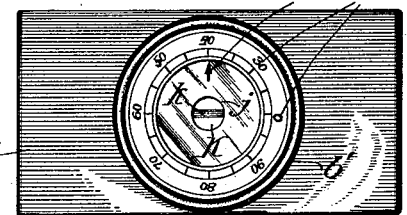
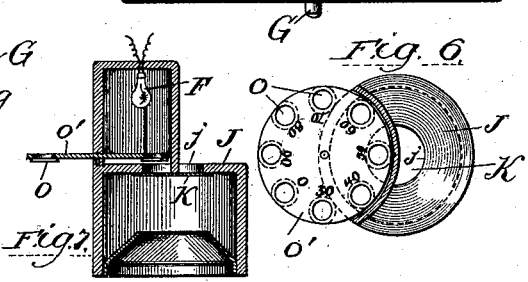
Witnesses:
Wm. Geiger
S. Frond
Inventor:
Eugene T. Turney
By Hopkins
Attorney.

UNITED STATES PATENT OFFICE.

EUGENE T. TURNEY, OF SAN FRANCISCO, CALIFORNIA.

PHOTOMETER.

SPECIFICATION forming part of Letters Patent No. 712,346, dated October 28, 1902.

Application filed June 23, 1902. Serial No. 112,840. (No model.)

*To all whom it may concern:*

Be it known that I, EUGENE T. TURNEY, a citizen of the United States, residing at San Francisco, in the county of San Francisco and State of California, have invented certain new and useful Improvements in Photometers, of which the following is a specification.

In carrying out my invention I make use of a screen onto which the rays of the light to be measured and also the rays of an isolated light, hereinafter called the "measuring-light," are projected, so that by the aspect of the screen under the influence of the two lights their relative powers or intensities may be observed.

Let it be supposed, for example, that the two lights are projected against the opposite faces of a translucent screen, that face of the screen against which the measuring-light is projected being inclosed in a suitable box, so as to exclude the rays of the light to be measured, while the opposite face of said screen is directly exposed to the light to be measured and also to view. If the measuring-light causes the exposed face of the screen to glow or make visible an image which is opaque or less translucent than the screen and which is visible only when light is transmitted through the screen, it follows that the measuring-light is stronger or more intense than the light being measured. Assuming this condition to exist, if the measuring-light be gradually decreased its visible aspect or illuminating effect upon the exposed face of the screen will gradually fade away and eventually vanish. When this vanishing-point is reached, it may be assumed that the two lights are equal, or practically so, (assuming the screen to be highly translucent,) so that the strength or intensity of the measuring-light at the vanishing-point being known the strength of the light to be measured is ascertainable.

The practical carrying out of the invention contemplates a balancing or equalizing of the illuminating effect of the two lights upon the exposed face of the screen, and since wide variations in the strength or intensity will be found in lights to be measured it follows that controllable means must be provided for varying the aspect of the measuring-light upon the exposed face of the screen. It should be noted that the important factor is the aspect of the measuring-light upon the exposed face of the screen. It makes absolutely no difference how much light is actually emitted by the lamp or other source from which the measuring-light is derived so long as its value as related to a known standard is known, and it makes no difference how the measuring-light is produced or by what means its aspect or illuminating effect upon the exposed face of the screen is varied. I prefer, however, to use a small incandescent electric lamp with controllable means for varying the current supplied to it, and consequently the power or intensity of the light emitted by it; but the same general ultimate results may be had by using a lamp of a constant intensity and interposing between it and the exposed face of the screen a controllable medium which will resist the passage of the light to the extent necessary to produce the desired results, the resisting value of the interposed medium being known. I therefore desire to have it understood that so far as this part of the invention is concerned it is not limited to any particular means, but, on the contrary, comprehends any means for varying the aspect of the measuring-light upon the exposed face of the screen, or, in other words, varying its illuminating effect as seen upon the exposed face of the screen. Furthermore, it is not essential that the two lights be projected against opposite faces of the screen, and in this respect the invention comprehends any arrangement that will enable the two lights to be so projected against the screen that their aspects, or, in other words, their illuminating effects upon the screen, may be observed, compared, and brought to a balance or equal status by varying the aspect of the measuring-light by any suitable controllable means.

The term "screen" as herein used is intended to comprehend any body of any suitable material against which the light may be projected so that its illuminating effect may be observed. In its preferred form the screen consists of a diaphragm of opaque or practically opaque material having through it an opening, preferably of circular form, covered by a diaphragm of translucent material, and this translucent diaphragm preferably carries an image of opaque material or material less translucent than the material of the diaphragm itself so arranged that it is visible from the exposed face of the screen only when the diaphragm is illuminated by rays of the measuring-light passing through it. Without the image the measuring-light if greater than the light to be measured causes the translucent diaphragm to glow, and this glow contrasting with the surrounding opaque portion of the screen is quite easily perceivable; but the dark image in the glowing field makes possible a more accurate measurement and materially facilitates the reading.

The invention consists in the features of novelty that are hereinafter described with reference to the accompanying drawings, which are made a part of this specification, and in which—

Figure 1 is a perspective view of a photometer embodying the invention in its preferred form. Fig. 2 is a plan view thereof, showing the exposed face of the screen as it appears when the power or intensity of the measuring-light is greater than the power or intensity of the light being measured. Fig. 3 is a view of the under face of the screen, or, in other words, the face against which the measuring-light is projected. Fig. 4 is an enlarged section cutting the screen through its center. Fig. 5 is a detail view showing the resistance-coil by which the current supplied to the lamp is controlled, the light-box being shown in section and the contact-spring in plan view. Figs. 6 and 7 are sectional views of a photometer differing somewhat from that shown in the preceding figures, but embodying some of the features of the invention under a modified form.

A represents a casing which contains a battery, the battery shown in the drawings being made up of two cells coupled in series.

B is a light-box mounted upon the casing A and preferably consisting of a cylindrical box-like part $b$, of metal, and a part $b'$ in the nature of a slip-cover made of metal and contacting with the part $b$ sufficiently close to form an electrical connection, said part $b'$ having through it an opening closed by a transparent crystal $b''$, preferably made of a thin sheet of transparent celluloid. Within the light-box is arranged a resistance-coil C, one terminal of which is connected electrically with one terminal of the battery D. The part $b'$ carries a contact-spring E, which is adapted to contact with the resistance-coil C. By rotating the part $b'$ the contact-spring E may be brought into contact with the resistance-coil at any desired distance from its receiving-terminal and in this way vary the resistance in the circuit. The part $b$ is in electrical connection with an incandescent electric lamp F, located within the light-box, and from this lamp the circuit back to the battery leads through a controllable contact device of any suitable form, so that while the circuit is normally open it may be closed for the purpose of supplying the lamp with current. As shown in the drawings, this contact device consists of a push-button G, which is in electrical connection with one side of the circuit through the medium of a plate $g$ and a connection $g'$ and is adapted to be brought into electrical contact with the other side of the circuit by forcing it inward in opposition to the resistance of a coiled spring H, the inner end of the so-called "push-button" being adapted to contact with a bolt I, by which the part $b$ of the light-box is held in place. In the normal condition of the apparatus the circuit is open between the push-button G and the bolt I. When the push-button is forced inward into contact with the bolt I, the circuit is closed and the lamp is lighted.

J is a diaphragm of opaque material, the outer face of which is visible through the opening in the part $b'$, so that said outer face is directly exposed to the light to be measured and to view. It has through it a circular opening $j$, and covering this opening is a diaphragm K, of translucent material. Preferably the diaphragm J is integral with a circular flange J', which slips into the space defined by the resistance-coil C, the parts J and J' being preferably of metal and insulated from the resistance-coil by a coating $j'$, of paper. The translucent diaphragm preferably consists of a piece of white paper, and preferably a strip $k$ of some opaque substance—say black paper—is arranged upon the inner face of the diaphragm K, so that it will cross the opening $j$ diametrically. With this arrangement when the lamp is lighted and the intensity of its emitted light is greater than the light falling upon the exposed face of the diaphragm the diaphragm will present a glowing appearance, and by this fact it will be known that the light upon the inner face of the diaphragm is greater than the light upon its outer face. From this it follows that if the light emitted by the lamp F be decreased in intensity to the point at which the diaphragm ceases to glow it will follow that the lights upon the opposite faces of the diaphragm are equal. For the purpose of thus controlling and regulating the intensity of the light emitted by the lamp F, I prefer to use the resistance-coil already described. It will be manifest that by simply turning the part $b'$ of the light-box one way or the other the spring E may be brought into contact with the resistance-coil at any desired distance from its receiving-terminal, and thus cut in or cut out resistance, as may be necessary, in order to balance or equalize the lights upon opposite faces of the diaphragm. The value in illuminating units of the light produced by the lamp F being known, it follows that when this light is brought to a balance or equality with the light falling upon the exposed face of the screen the two lights are equal, and by the aid of a suitable scale or indicating device the result may be read. This scale or indicating device preferably consists of an index or pointer M, arranged in fixed relation to the screen, and a series of graduations N, carried by the part $b'$ of the light-box, and consequently bearing a fixed relation to the contact device E. By simply turning the part $b'$ the point of contact with the resistance-coil is changed, and the relation of the index or pointer M to the graduations N will indicate the point at which the contact with the resistance-coil is made, and inferentially the power or intensity of the light emitted by the lamp F. I have already intimated, however, that the important factor is the aspect or appearance of the exposed face of the screen under the influence of the measuring-light. While I prefer to control this aspect by directly controlling the power or intensity of the measuring-light, still the invention is not limited thereto, and in Figs. 6 and 7 of the drawings I have shown a device in which the measuring-light remains constant in power or intensity at its point of production, but is varied at its point of contact with the screen by means of an interposed medium. I have here shown the diaphragm as being divided, so that the measuring-light and the light to be measured fall upon it upon opposite sides of a dividing-wall, but both upon the same face of the diaphragm itself. The variation in the aspect of the measuring-light upon the face of the diaphragm is produced by interposing between the lamp and the diaphragm one or another of a number of screens O of different degrees of translucence. These screens are shown as being mounted upon a rotatable disk O', having through it a number of openings, any one of which is adapted to be brought into the line between the lamp or other source of measuring-light and the diaphragm or screen K. Each of these openings is covered by a film, preferably a sheet of paper, and these films differ in their capacities for transmitting light. Each of them bears a known relation to a standard, and this relation is indicated by numbers or other suitable indicating devices. It is manifest that with this modified form of the device the aspect of the measuring-light upon the reading-face of the screen may be varied by interposing one or another of the films, and the result will be precisely the same as it would be if the intensity of the measuring-light itself were varied.

I have described two embodiments of my invention; but I desire to have it understood that in its broadest aspect it is not limited to either of them, but, on the contrary, comprehends any arrangement by which the aspect of the measuring-light—i. e., the appearance which the measuring-light produces—upon the reading-face of the screen, one face of which is directly exposed to the light to be measured, may be varied in combination with a suitable indicating device, by means of which the result may be read.

Having thus described my invention, the following is what I claim as new therein and desire to secure by Letters Patent:

1. In a photometer, the combination of a screen having means for indicating the relative intensity of two lights, one face of said screen being exposed to the direct rays of the light to be measured and also exposed to direct view, a light-box covering the opposite face of the screen, means for producing, within the light-box, a measuring-light, and controllable means for varying the aspect of the measuring-light upon the screen, substantially as described.

2. In a photometer, the combination of a screen, having means for indicating the relative intensity of two lights, one face of said screen being exposed to the direct rays of the light to be measured, and also exposed to direct view, a light-box covering the opposite face of the screen, means for producing within the light-box, a measuring-light, and controllable means for varying the intensity of the measuring-light, substantially as described.

3. In a photometer, the combination of a screen, having means for indicating the relative intensities of two lights, one face of said screen being exposed to the direct rays of the light to be measured and also exposed to direct view, a light-box covering the opposite face of the screen, means for producing within the light-box a measuring-light, controllable means for varying the aspect of the measuring-light upon the screen, and an indicator operatively connected with said controllable means, substantially as described.

4. In a photometer, the combination of a screen having means for indicating the relative intensity of two lights, one face of said screen being exposed to the direct rays of the light to be measured and also exposed to direct view, a light-box covering the opposite face of the screen, means for producing, within the light-box, a measuring-light, controllable means for varying the aspect of the measuring-light upon the screen, and an indicator operatively connected with said controllable means, substantially as described.

5. In a photometer, the combination of a screen, a light-box covering one face of the screen, an electric lamp located within the light-box and adapted to produce the measuring-light, controllable means for varying the current supplied to said lamp and an indicator operatively related to said controllable means, substantially as described.

6. In a photometer, the combination of a screen adapted to receive the light to be measured, a light-box covering one face of the screen, an electric lamp, located within the light-box, and in fixed relation to the screen, for producing the measuring-light, and controllable means for varying the current supplied to the lamp, substantially as described.

7. In a photometer, the combination of a screen adapted to receive the light to be measured, a light-box covering one face of the screen, an electric lamp located within the light-box and in fixed relation to the screen for producing the measuring-light, controllable means for varying the current supplied to the lamp, and an indicator operatively related to said controllable means, substantially as described.

8. In a photometer, the combination of a screen adapted to receive the measuring-light and also the light to be measured, an electric lamp for producing the measuring-light, controllable means including a rotatable part for varying the current supplied to said lamp, and an indicating device carried by said rotatable part, substantially as described.

9. In a photometer, the combination of a translucent screen, a light-box covering one face of said screen, means for producing within the light-box, a measuring-light, controllable means for varying the aspect of the measuring-light upon the screen, and a dark image visible upon the translucent screen only by the transmission of the measuring-light through the screen, substantially as described.

10. In a photometer, the combination of a screen in the form of a diaphragm of opaque material having through it an opening covered by a diaphragm of translucent material and a dark image on the inside of said translucent diaphragm, a light-box covering one face of the screen, means for producing within the light-box, a measuring-light, controllable means for varying said light, and an indicator operatively related to said light-controlling means, substantially as described.

11. In a photometer, the combination of a screen, a light-box covering one face of the screen, an electric lamp located within the light-box for producing the measuring-light, a resistance-coil, a variable contact, a circuit including the lamp, coil and contact, means for supplying said circuit with a current of electricity, a movable part carrying said contact, and an indicating device carried by said movable part, substantially as described.

12. In a photometer, the combination of a screen, one face of which is directly exposed to the light to be measured, a light-box covering the opposite face of the screen and having a rotatable part, means for producing a measuring-light within the light-box, means operatively related to said rotatable part for varying the measuring-light, and an indicator operatively related to said rotatable part, substantially as described.

13. In a photometer, the combination of a screen having means for indicating the relative intensity of two lights, said screen being exposed to the direct rays of the light to be measured and also exposed to direct view, a light-box for confining the measuring-light and directing it against the screen, means for producing the measuring-light within the light-box, and controllable means for varying the aspect of the measuring-light upon the screen, substantially as described.

EUGENE T. TURNEY.

Witnesses:
L. M. HOPKINS,
S. FROME.